United States Patent
Hamanaka

(10) Patent No.: US 6,778,605 B1
(45) Date of Patent: Aug. 17, 2004

(54) IMAGE PROCESSING APPARATUS AND METHOD

(75) Inventor: Akiyoshi Hamanaka, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,183

(22) Filed: Mar. 15, 2000

(30) Foreign Application Priority Data

Mar. 19, 1999 (JP) ............................................ 11-076876

(51) Int. Cl.[7] .............................. H04N 7/12; G06K 9/36
(52) U.S. Cl. ................ 375/240.16; 382/236; 348/416.1
(58) Field of Search ........................ 375/240.16, 240.14, 375/240.11, 240.06, 240.15; 348/699, 208.4, 416.1, 402.1, 413.1; 382/236, 238

(56) References Cited

U.S. PATENT DOCUMENTS

| | | | |
|---|---|---|---|
| 5,430,480 A | * | 7/1995 | Allen et al. ............... 348/208.4 |
| 5,557,341 A | * | 9/1996 | Weiss et al. ................. 348/699 |
| 5,561,532 A | | 10/1996 | Ohnishi et al. ................ 386/47 |
| 5,617,143 A | | 4/1997 | Shimokoriyama et al. .. 348/407 |
| 5,657,087 A | * | 8/1997 | Jeong et al. ........... 375/240.16 |
| 5,801,778 A | * | 9/1998 | Ju .......................... 375/240.15 |
| 5,874,996 A | | 2/1999 | Shimokoriyama et al. .. 348/407 |
| 5,886,742 A | * | 3/1999 | Hibi et al. ............. 375/240.16 |
| 6,249,613 B1 | * | 6/2001 | Crinon et al. ............... 382/236 |

* cited by examiner

*Primary Examiner*—Gims Philippe
(74) *Attorney, Agent, or Firm*—Fitzpatrick, Cella, Harper & Scinto

(57) ABSTRACT

An encoding apparatus/method for encoding input image data on a block unit basis of a predetermined size by using a motion compensation is provided. Among blocks constructing one picture, motion vectors with respect to blocks located at a first predetermined position are searched. A first motion vector showing a motion of image data of one picture is formed from the searched motion vectors of the blocks. A motion compensation is performed to the input image data in accordance with the formed first motion vector, thereby encoding the data.

16 Claims, 12 Drawing Sheets

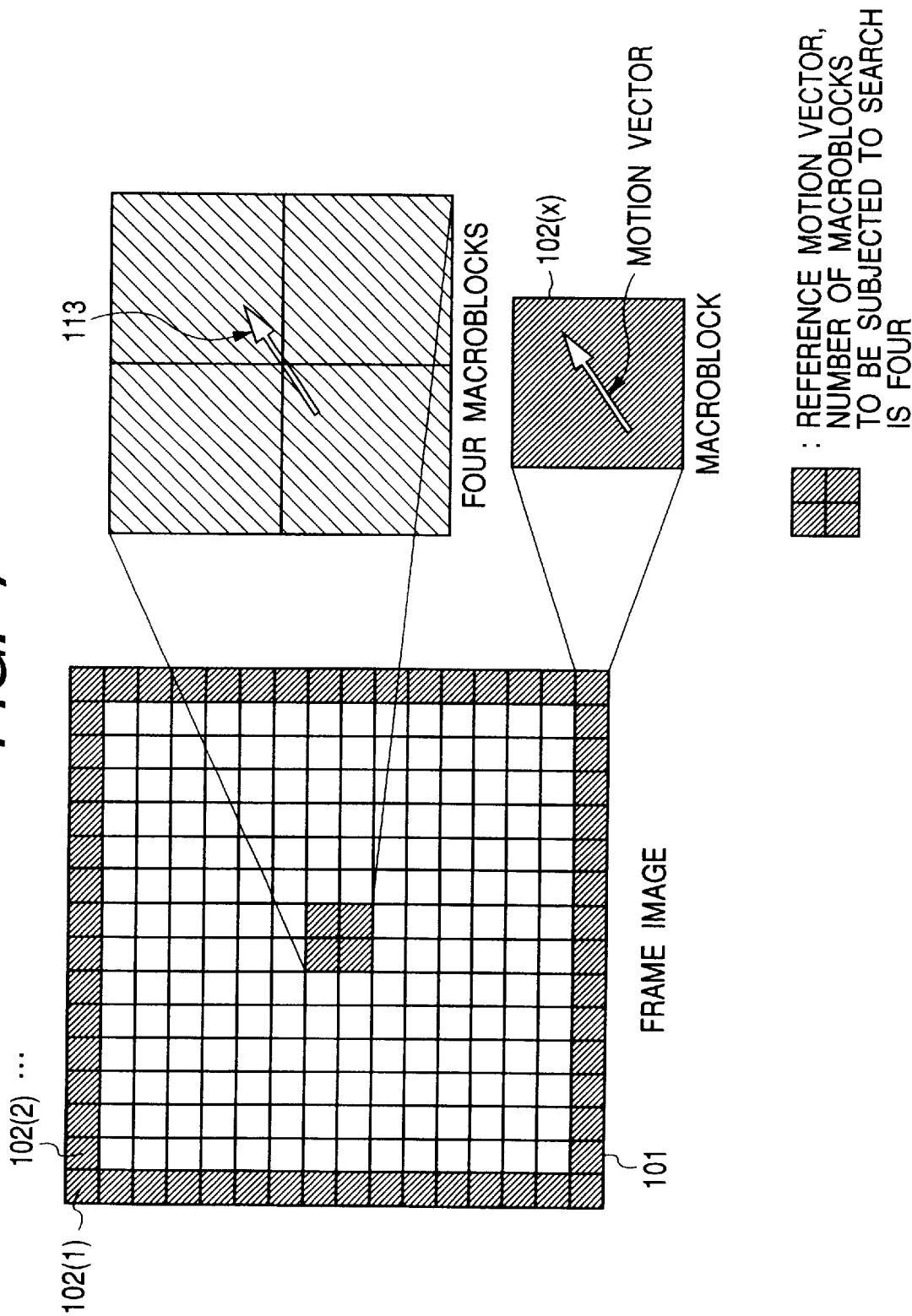

IMAGE PROCESSING APPARATUS AND METHOD

BACKGROUND OF THE INVENTION

1. Field of the Invention

The invention relates to an image processing apparatus and method and, more particularly, to an encoding technique for encoding image data.

2. Related Background Art

For example, in an interframe or interfield encoding (it is assumed that "interframe encoding" is used here) using a motion compensation represented by MPEG, a detection (search) of a motion vector is performed to forward and backward frames around a target frame to be subjected to an encoding on a unit basis ("macroblock unit" here) of a macroblock or a block of (8×8) pixels.

In this instance, a search for motion vectors is uniformly made to all macroblocks existing in the target frame irrespective of an amount of motion between frames regarding image data in the actual macroblock, or a search range for the motion vectors is limited to a predetermined range around a target macroblock to be subjected to an encoding, due to a requirement for the real-time operations of encoding and decoding, and the motion vectors are searched in such a range. The search range for the motion vector in this instance is also often determined from the limitation of a processing time caused by hardware and a processing time caused by software, irrespective of an actual motion amount of image data of each macroblock.

However, hitherto, in case of performing a motion compensation by searching for a motion vector in a certain limited predetermined range, since the search range is determined irrespective of the actual motion amount of the image data of each macroblock as mentioned above, there is a possibility that the object that a code amount is reduced by decreasing redundancy of image data between frames, which is an advantage of the interframe encoding using the motion compensation, is not accomplished, for example, if the actual motion vector exceeds the search range.

In the work such that the image data which was orthogonal-transformed (for example, 2-dimensional discrete cosine transform: DCT, or the like) is divided by a quantization coefficient weighted by a frequency, which work is one of the processing steps in the image data compressing method which is executed in the MPEG or the like, the quantization coefficient is also determined on the basis of the final generation code amount irrespective of the motion amount of the image data in the target macroblock to be subjected to the encoding. Therefore, the quantization coefficient cannot be corrected in accordance with the motion amount, so that there is a danger of causing the deterioration of the picture quality.

SUMMARY OF THE INVENTION

In consideration of circumstances as mentioned above, it is an object of the invention to provide an encoding apparatus and method which can efficiently encode image data and improve a picture quality.

To accomplish the above object, according to a preferred aspect of the invention, there is provided an encoding apparatus/method of encoding input image data by using a motion compensation on a unit basis of block of a predetermined size, comprising the steps of: searching for a motion vector with respect to a block located at a first predetermined position among blocks constructing one picture; forming a first motion vector representing a motion of image data of one picture from the searched motion vector of each block; and performing the motion compensation on the input image data in accordance with the formed first motion vector to encode the image data.

Other objects, features and advantages of the invention will become apparent from the following detailed description taken in conjunction with the accompanying drawings.

BRIEF DESCRIPTION OF THE DRAWINGS

FIG. 7 is a diagram for explaining another example of a block from which a motion vector is searched at the top priority when the GMV and RMV are formed;

DETAILED DESCRIPTION OF THE PREFERRED EMBODIMENTS

Embodiments of the invention will now be described hereinbelow with reference to the drawings.

The first embodiment of the invention will be described.

First, explanation will be made with respect to processing steps from a step of forming a motion vector (global motion vector: hereinafter, abbreviated to a "GMV") showing a motion of the whole frame or field ("frame" is used here) to be subjected to an encoding to a step of deciding an encoding mode on the basis of a size of the GMV in an encoding method to which the invention is applied.

Figure 1:
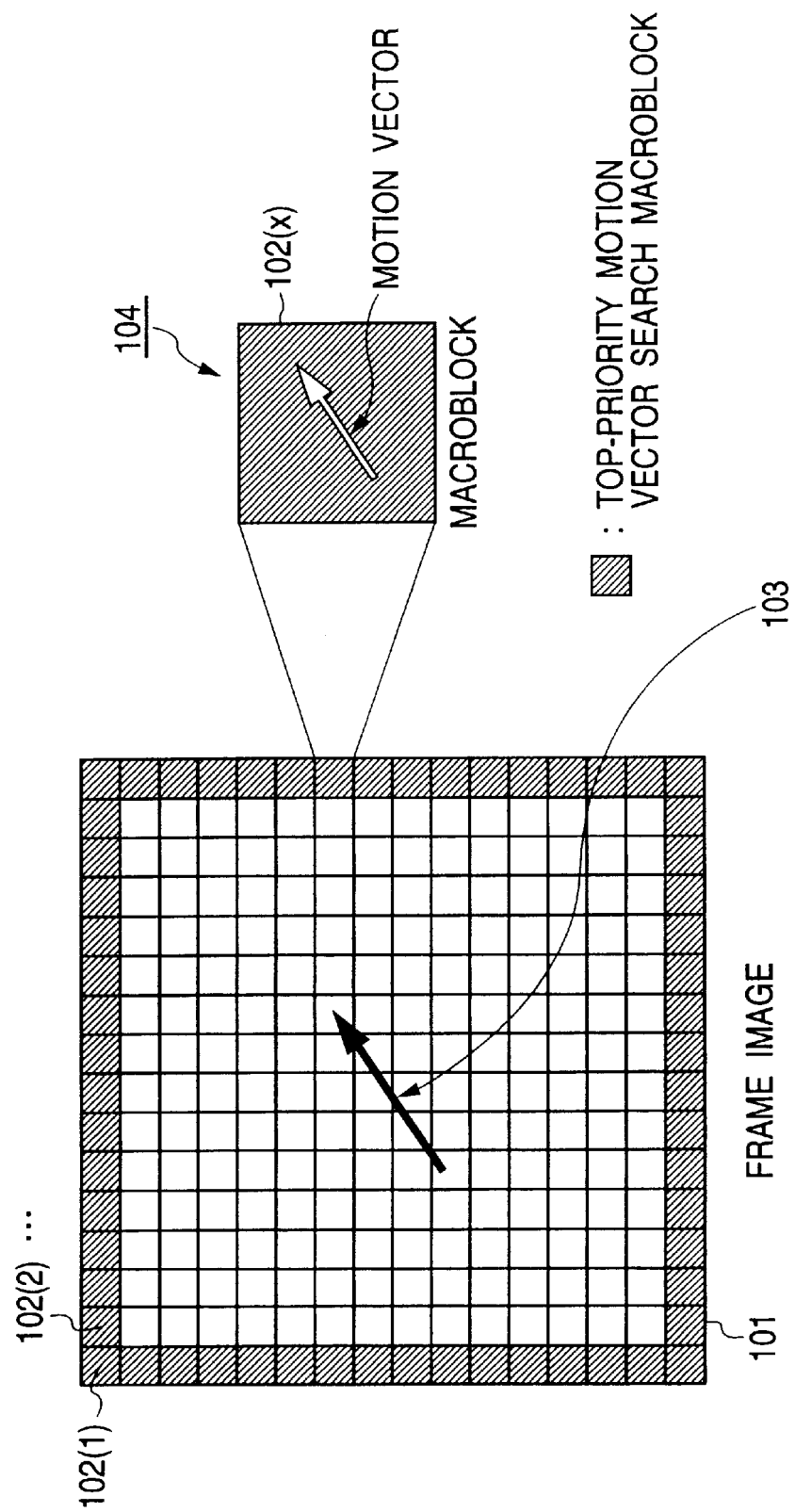
FIG. 1 is a diagram for explaining a forming process of a motion vector (global motion vector: GMV) showing a whole motion of a target frame to be subjected to an encoding in an encoding method to which the invention in the first embodiment is applied.

For example, as shown in FIG. 1, image data of one frame 101 to be subjected to the encoding is divided into blocks or macroblocks ("blocks" here) of a size of n×n pixels (n: integer). In FIG. 1, blocks 102(1), 102(2), . . . shown by painted portions are blocks from which a motion vector is searched (detected) at the top priority in order to define a GMV 103.

To form the GMV 103, first, as shown at "104" in FIG. 1, forward and backward motion vectors are searched with respect to all of the blocks 102(1), 102(2), . . . , 102(x), . . . locating at the outermost periphery of an image of the frame 101.

Figure 2:
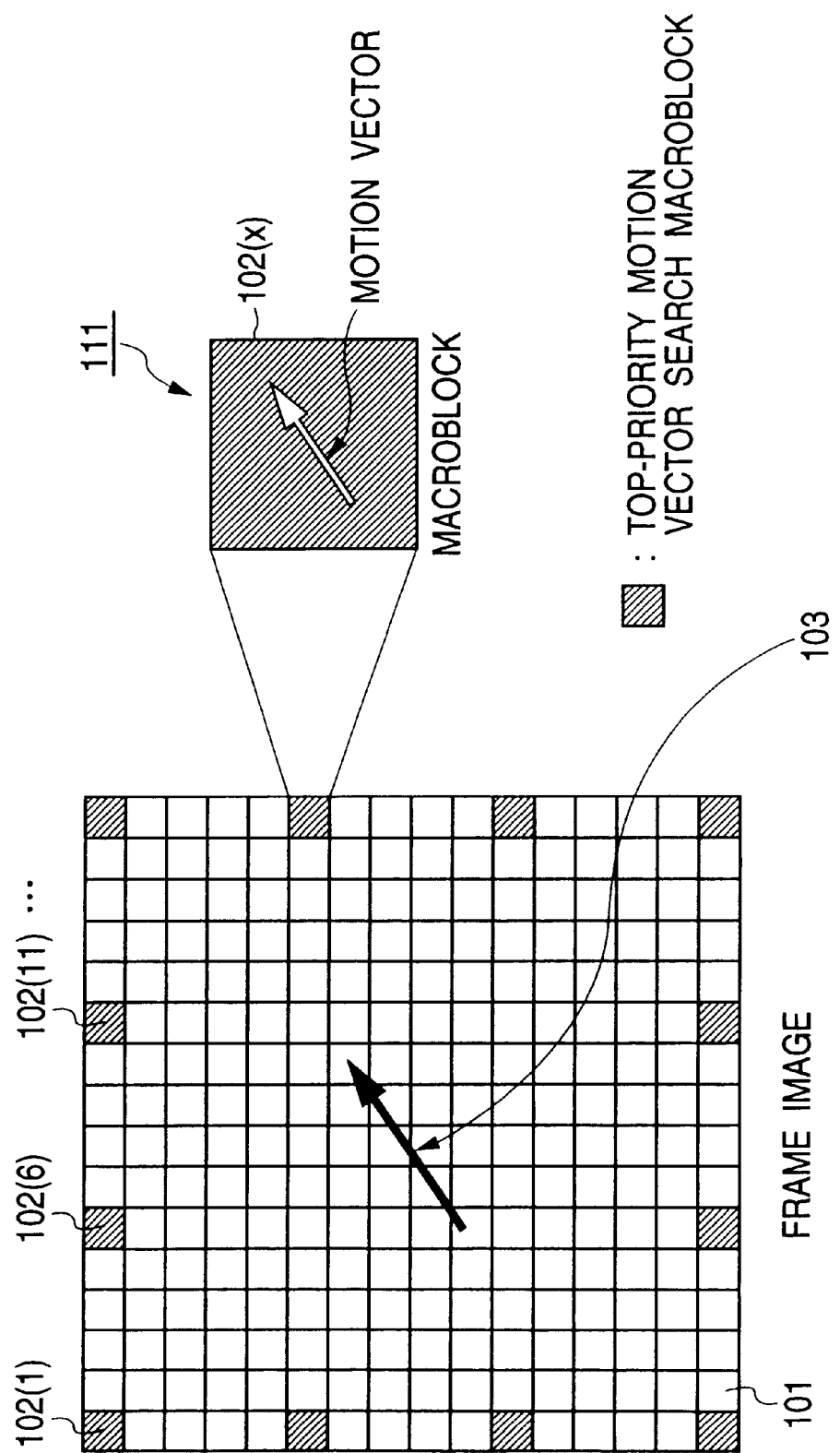
FIG. 2 is a diagram for explaining another example of a block from which a motion vector is searched at the top priority when the GMV is formed.

The invention dose not limit the searching method of the motion vector shown here but can use an arbitrary method as hitherto used. In the blocks 102(1), 102(2), . . . , 102(x), . . . locating at the outermost periphery of the frame 101, the blocks from which the motion vectors are searched at the top priority can be set to, for example, the blocks 102(1), 102(6), 102(11), . . . locating at predetermined intervals as shown in FIG. 2.

An average value of the motion vectors of the blocks 102(1), 102(2), . . . , 102(x), . . . is subsequently obtained and defined as a GMV 103.

The GMV 103 defined as mentioned above is compared with a plurality of threshold values which have been defined in advance, thereby discriminating the whole motion of the present frame 101. By selecting an encoding mode of the present frame 101 (for example, intraframe encoding, forward predictive interframe encoding, bidirectional interframe encoding, or the like) in accordance with the amount of the discriminated motion, a balance of a picture quality between a code amount is kept.

The discrimination reference of the encoding mode for the amount of GMV 103 can be set to an arbitrary reference which is determined by a design purpose of an encoder or the like.

When the encoding using the motion compensation is executed to the frame 101 in the encoding mode defined as mentioned above, the motion vector for the motion compensation is searched as follows.

That is, a search range which is offset from the predefined search range by an amount corresponding to the GMV 103 is set as a search range to be used when the motion vectors are searched with respect to all of the remaining blocks (blocks other than the blocks 102(1), 102(2), . . . locating at the outermost periphery of the frame 101) from which no motion vector was searched at the top priority. The motion vectors are searched from the blocks within the set search range.

The second embodiment of the invention will now be described.

In the embodiment, as shown in FIG. 2, the blocks from which the motion vectors are obtained at the top priority in the frame 101 to be subjected to the encoding are set to partial blocks 102(1), 102(6), 102(11), . . . among the blocks 102(1), 102(2), locating at the outermost periphery of the frame 101.

In a manner similar to the first embodiment, first, as shown at "111" in FIG. 2, motion vectors of the blocks 102(1), 102(6), 102(11), . . . are searched and an average value of the obtained motion vectors is defined as a GMV 103.

Subsequently, as shown at "112" in FIG. 3, a plurality of blocks (hatched portions) locating near the center of the frame 101 are selected, motion vectors of those blocks are searched, and their average value is obtained. This average value is defined as a reference motion vector (hereinafter, abbreviated to an "RMV") 113.

The motion vectors for motion compensation are searched as follows by using the GMV 103 and RMV 113 defined as mentioned above.

Figure 4:
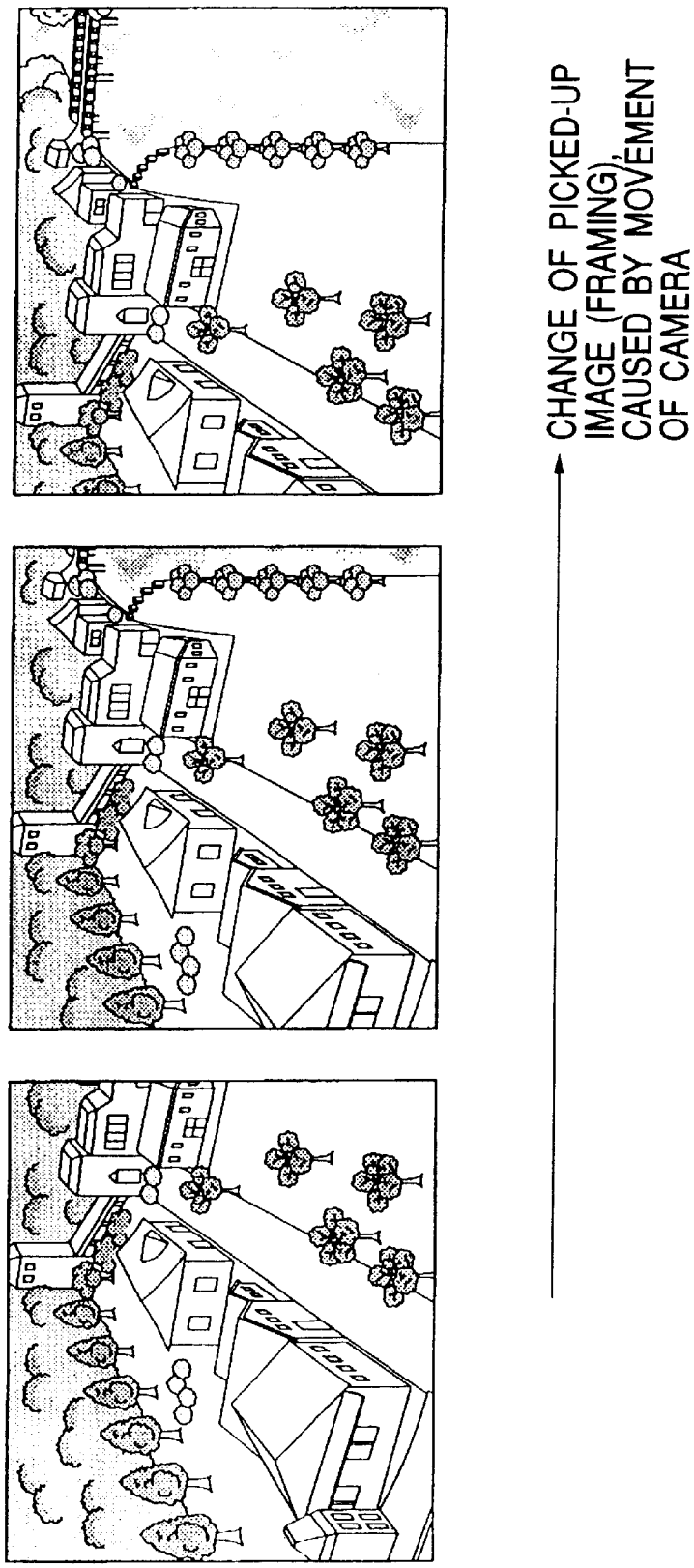
FIG. 4 is a diagram for explaining an image of the present frame in the case where it is determined by the GMV and RMV that such an image is an image which is moving as a whole for an image of a frame that is preceding and subsequent with respect to time.
Figure 5:
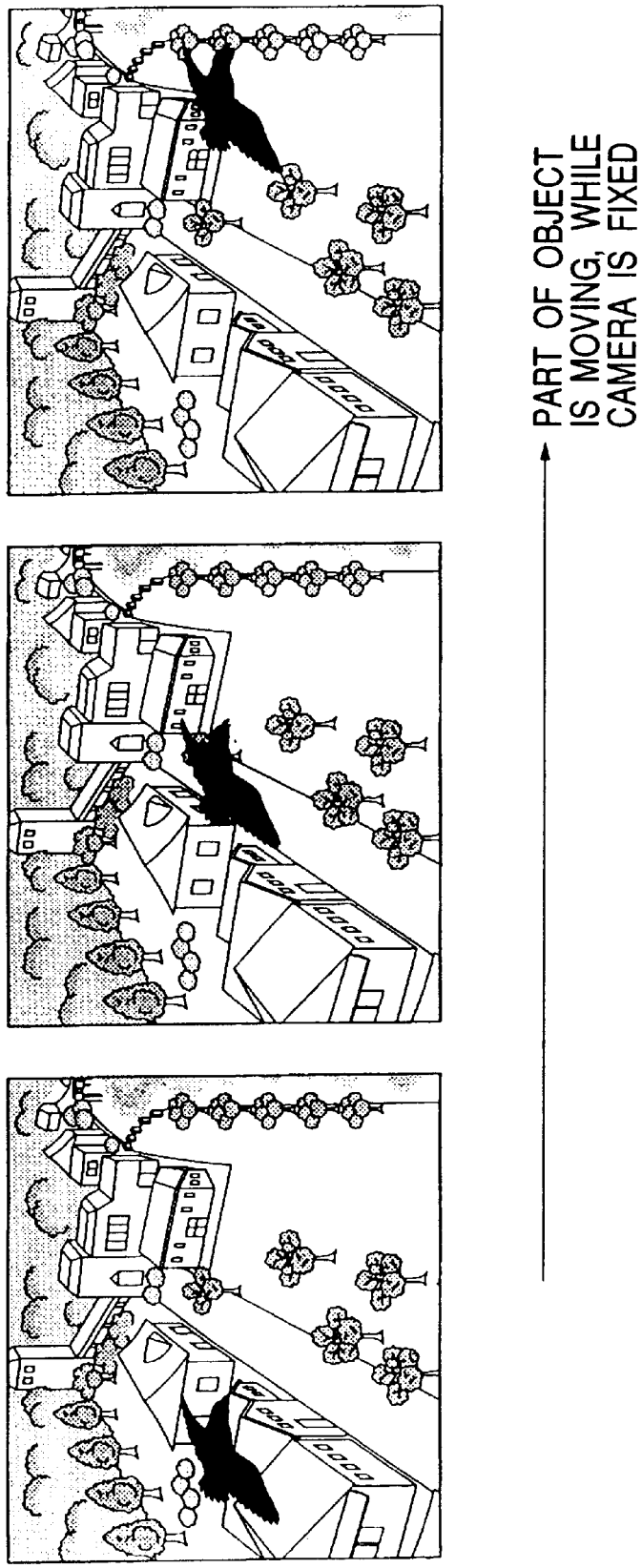
FIG. 5 is a diagram for explaining an image of the present frame in the case where it is determined by the GMV and RMV that a part of such an image is moving (changing)

That is, by comparing the GMV 103 with RMV 113, it is discriminated whether the image of the present frame 101 is moving as a whole for the images of the frames which are preceding and subsequent with respect to time (whether there is a movement of framing due to the movement of a camera or the like) as shown in FIG. 4, or a part ("bird" here) of the image in the frame is moving (changing) as shown in FIG. 5.

Figure 6A:
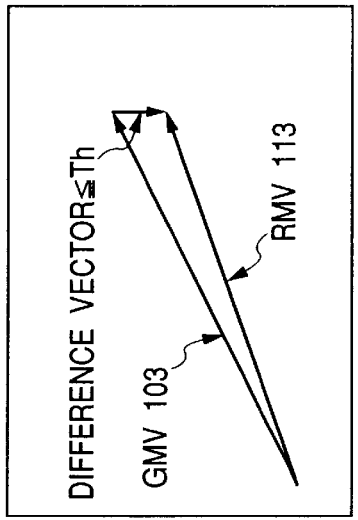
FIGS. 6A, 6B, 6C and 6D are diagrams for explaining a reference of a discrimination of the GMV and RMV.
Figure 6B:
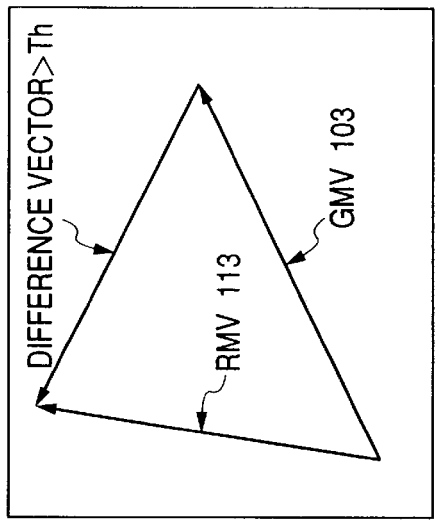
Figure 6C:
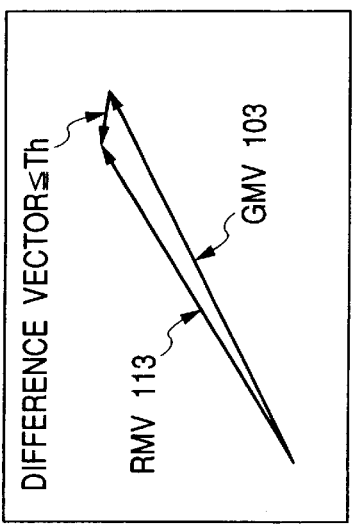
Figure 6D:
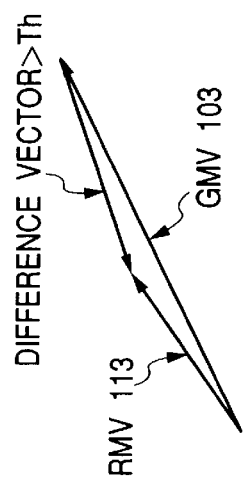

Specifically speaking, the GMV 103 and RMV 113 are compared and when a difference vector of the both is equal to or less than a predetermined threshold value Th as shown in FIG. 6A or 6B, it is determined that the image of the frame is moving as a whole as shown in FIG. 4. When the difference vector between them exceeds the predetermined threshold value Th as shown in FIG. 6C or 6D, it is determined that a part of the image of the frame as shown in FIG. 5 is moving or the image is an image other than a state shown in FIG. 4 such as a scene change (image in which the scene is suddenly changed) or the like.

Three images shown in FIGS. 4 and 5 show a state where the image advances from the left to the right with respect to time. For example, the images in FIG. 4 are obtained by photographing a scene while horizontally moving (from the left to the right) the camera. The images of FIG. 5 are obtained by photographing an object when a part ("bird" here) of the object is moved from the left to the right of a frame in the case where the object is photographed with the camera fixed.

As a result of the discrimination, if it is determined that the image of the present frame 101 is moving as a whole (refer to FIG. 4), motion vectors of all blocks in the frame 101 including the block from which the search for the motion vector is not made are replaced with the RMV 113. The search for the motion vector of the present frame 101 is finished and the next compressing process such as orthogonal transformation, quantization, or the like is performed.

When it is decided that a part of the image of the present frame 101 is moving (refer to FIG. 5), the GMV 103 is compared with the motion vector of each block in the frame 101. On the basis of a comparison result, a process such as an adjustment of weight or the like for the quantization coefficient is executed, thereby optimizing the code amount and picture quality according to a design purpose.

Specifically speaking, first, it is generally considered that a correlation between the frames (or fields) of a motion image is high, except for a scene change such as "cut & dissolve" or the like in which a pattern largely changes in the whole frame. Therefore, the GMV 103 is compared with the motion vectors (forward and backward) of each block in the frame 101 and a comparison result is reflected to amount of motion of each block.

For example, the block in which a difference value between the GMV 103 and the motion vector is equal to or larger than a predetermined threshold value is determined to have a motion of large amount, and the quantization coefficient is changed or adjusted. On the contrary, the block in which a difference value between the GMV 103 and the motion vector is equal to or smaller than the predetermined threshold value is determined to have a motion of small amount, and the quantization coefficient is changed or adjusted. For example, if importance is attached to the picture quality of a portion having a motion, the quantization coefficient is adjusted so as to decrease for the block of a large motion and the quantization coefficient is adjusted so as to increase for the block of a small motion, thereby adjusting the picture quality. The picture quality can be also adjusted in a manner opposite to that mentioned above. Such a process according to the evaluation result of the difference between the GMV 103 and the motion vector can be modified in accordance with a design purpose of the encoder.

In the first and second embodiments, in order to define the GMV 103, the average value of the motion vectors of the blocks 102(1), 102(2), . . . locating at the outermost periphery of the frame 101 or the partial blocks 102(1), 102(6), 102(11), . . . has been used. However, the invention is not limited to this. For example, a weighting process using the positions of the blocks as parameters or a function other than the average value can be also used in accordance with the nature of the image that is handled.

In a manner similar to the above, also as for the definition of the GMV 103, it is not limited to the average value of the motion vectors of each block but a result of an arbitrary arithmetic operating process can be used.

Figure 3:
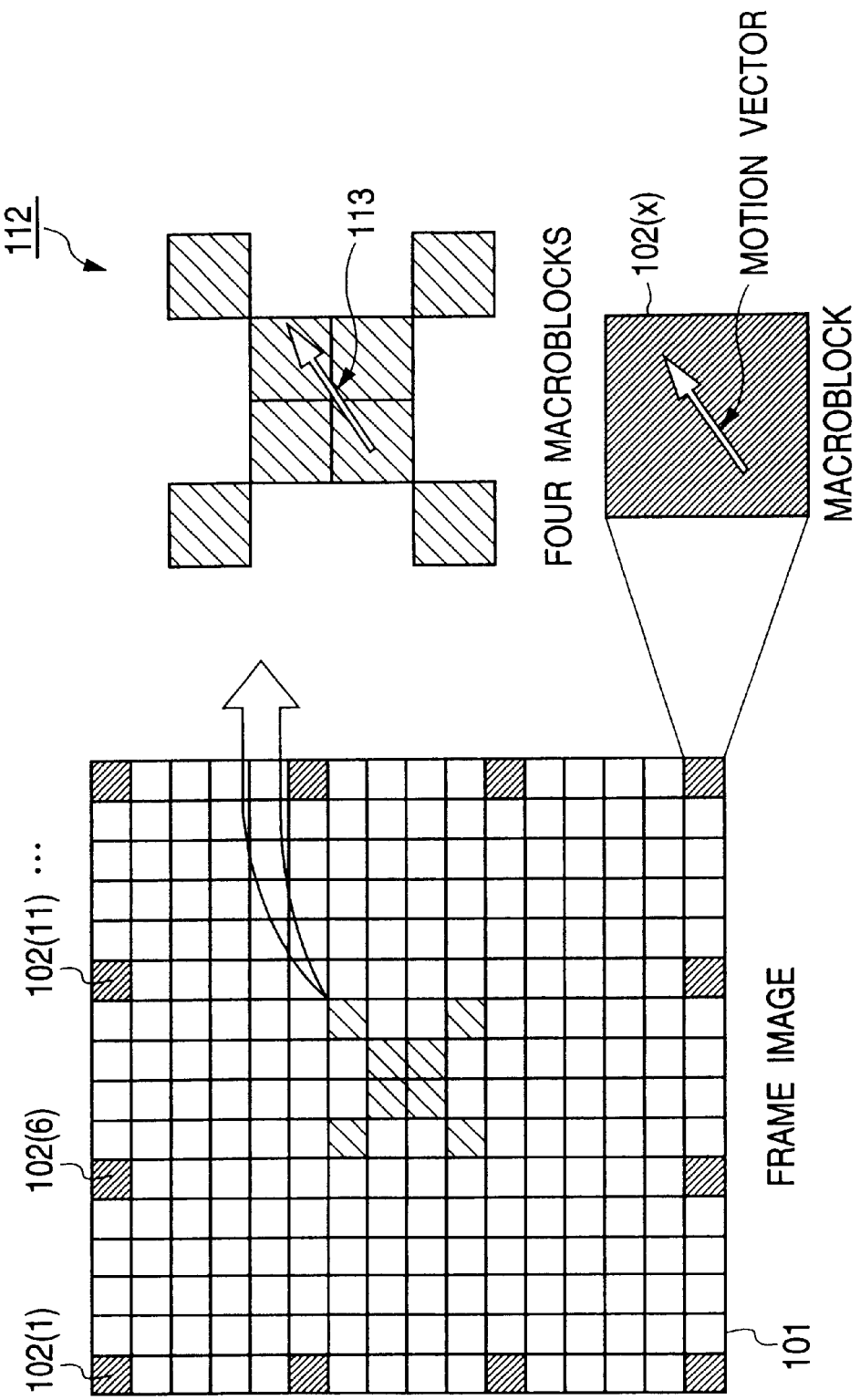
FIG. 3 is a diagram for explaining a forming process of the motion vector (global motion vector: GMV) showing a whole motion of a target frame to be subjected to an encoding and a reference motion vector (RMV) in an encoding method to which the invention in the second embodiment is applied.

The selecting methods of the positions and the number of blocks for obtaining the motion vector at the top priority to define the GMV 103 and blocks near the center of the frame 101 to define the RMV 113 are not limited to the methods shown in FIGS. 1 to 3.

For example, as shown in FIG. 7, in the second embodiment, it is also possible to define the GMV 103 from the motion vectors of the blocks 102(1), 102(2), . . . locating at the outermost periphery of the frame 101 and define the RMV 113 from the motion vectors of four blocks at the center of the frame 101.

Figure 8:
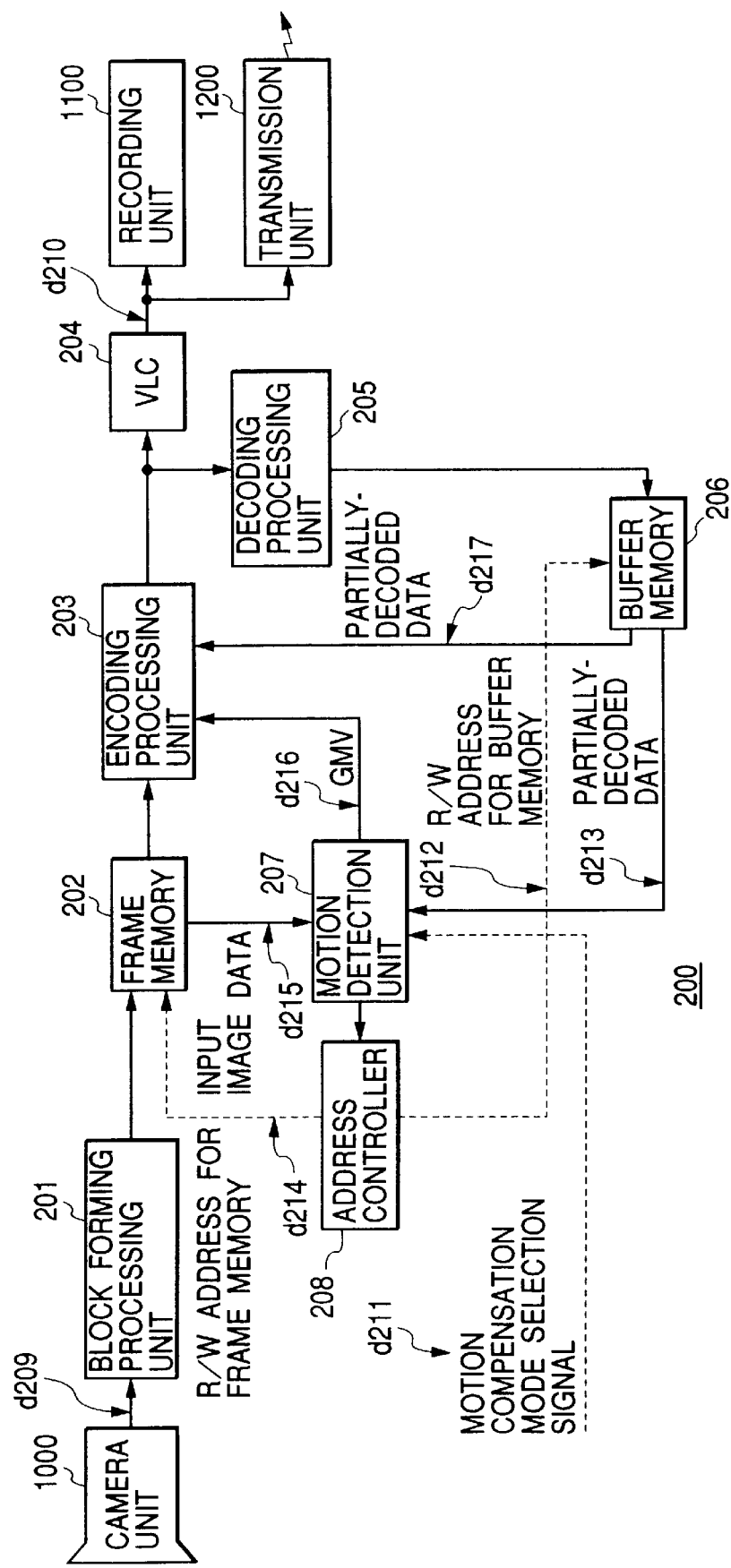
FIG. 8 is a block diagram showing a construction of a video camera to which the invention is applied in the third embodiment.

FIG. 8 is a block diagram showing a construction of a video camera according to the invention as a third embodiment of the invention.

The video camera of FIG. 8 is shown as an example of a hardware construction having the function of the encoding method of the first embodiment.

A video camera 200 shown in FIG. 8 is constructed by: a camera unit 1000 for generating image data by photographing an object image; a block forming processing unit 201 for dividing image data d209 generated from the camera unit 1000 into blocks of a predetermined size; a frame memory 202 for storing the image data d209 through the block forming processing unit 201; an encoding processing unit 203 for performing a motion predicting (compensating) process, a compressing process, and the like; a variable length coding processing unit 204 for giving a variable length code to the encoded image data which is outputted from the encoding processing unit 203; a recording unit 1100 for recording the variable length encoded data which is outputted from the variable length coding processing unit 204 to a recording medium (hard disk, magnetic tape, or the like); and a transmission unit 1200 for transmitting the variable length encoded data which is outputted from the variable length coding processing unit 204 to the outside by using an IEEE1394 bus, the Internet, or the like.

The video camera further comprises: a decoding processing unit 205 for decoding the encoded image data which is outputted from the encoding processing unit 203; a buffer memory 206 for storing partially-decoded image data which is outputted from the decoding processing unit 205; a motion detection unit 207 for forming a motion vector (GMV) from image data d215 which is outputted from the frame memory 202 and partially-decoded image data d213 which is outputted from the buffer memory 206; and an address controller 208 for controlling read/write addresses of the frame memory 202 and buffer memory 206 in accordance with an output of the motion detection unit 207.

A detailed construction of the motion detection unit 207 will now be described with reference to FIG. 9.

Figure 9:
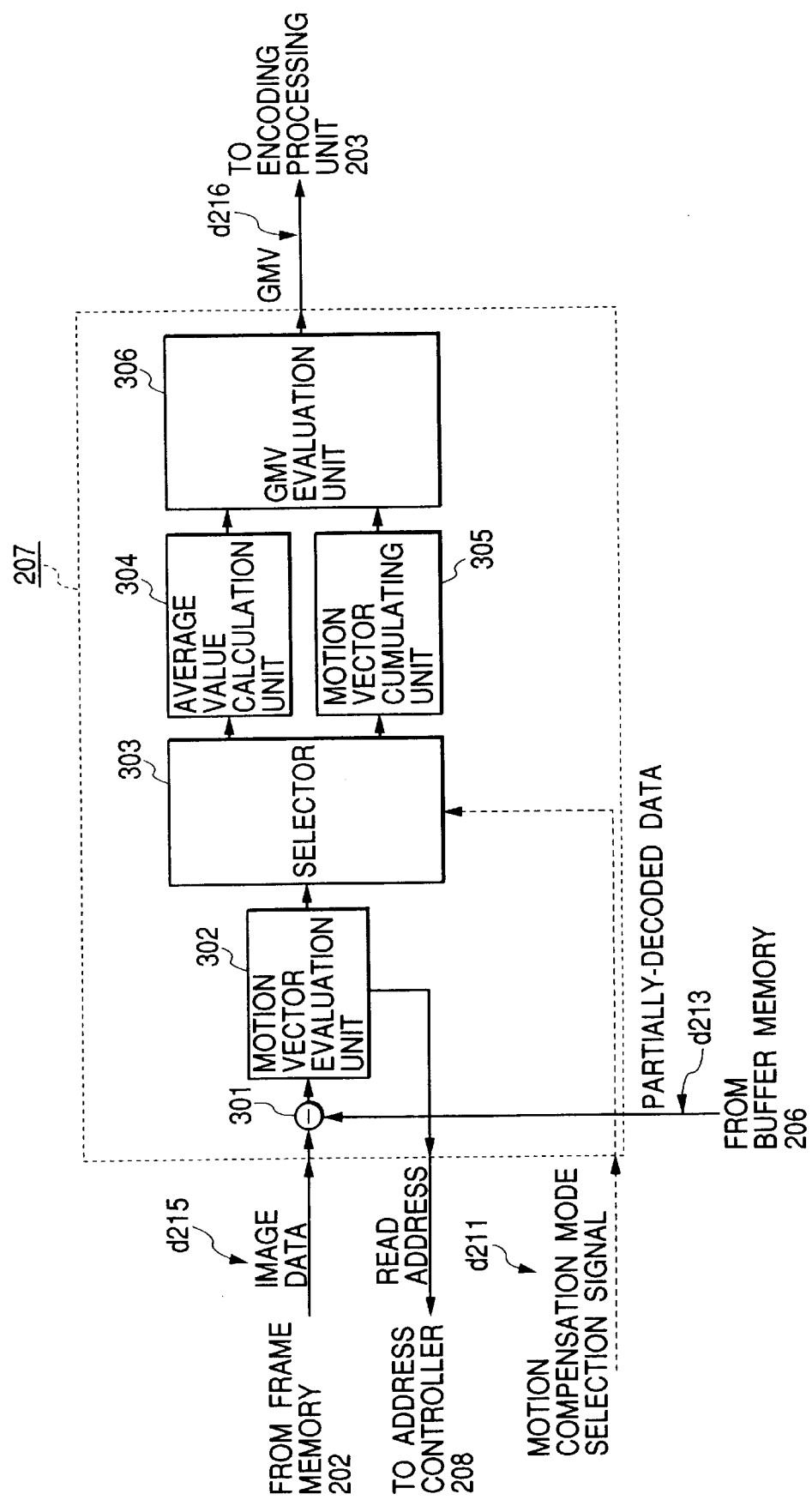
FIG. 9 is a block diagram showing a construction of a motion detection unit 207 in FIG. 8.

As shown in FIG. 9, the motion detection unit 207 comprises: a subtractor 301 for detecting a difference between the image data d215 which is outputted from the frame memory 202 and the partially-decoded image data d213 which is outputted from the buffer memory 206; a motion vector evaluation unit 302 for evaluating a magnitude of subtraction result (difference value) of the subtractor 301; a selector 303 for selecting an evaluating method of the GMV from a plurality of methods (it is now assumed that there are two methods of an "evaluating method by an average value" and an "evaluating method by a weight cumulation") by an arithmetic operation such as average value, a weight cumulation, or the like in accordance with an output of the motion vector evaluation unit 302; an average value calculation unit 304 and a motion vector cumulating unit 305 which operate in accordance with an output of the selector 303; and a GMV evaluation unit 306 for deciding the GMV from an output of the average value calculation unit 304 or motion vector cumulating unit 305. The output of the motion vector evaluation unit 302 is supplied to the address controller 208. An output of the GMV evaluation unit 306 is supplied to the encoding processing unit 203.

In the video camera constructed as mentioned above, the image data d209 from the camera unit 1000 is first inputted to the block forming processing unit 201. The block forming processing unit 201 divides the image data d209 into blocks of a predetermined size and once stores it into the frame memory 202.

The block forming image data stored in the frame memory 202 is sequentially inputted to the encoding processing unit 203 and motion detection unit 207 in response to a read address signal d214 for the frame memory which is outputted from the address controller 208.

The encoding processing unit 203 executes a motion compensating process based on a GMV d216 from the motion detection unit 207, which will be explained hereinlater, on the block forming image data from the frame memory 202 on a block unit basis, after that, executes a compressing process such as DCT (orthogonal transformation), quantization, or the like to a predictive error signal thus obtained, and supplies the processed block forming image data as encoded image data to the variable length coding processing unit 204 and decoding processing unit 205.

The search for the motion vector for motion compensation in the encoding processing unit 203 will be explained hereinlater.

The variable length coding processing unit 204 gives a variable length code (VLC) to the encoded image data from the encoding processing unit 203 and, thereafter, supplies it as variable length encoded data d210 to the recording unit 1100 and transmission unit 1200.

The recording unit 1100 records the variable length encoded data d210 on the recording medium (hard disk, optical disk, memory card, magnetic tape, etc.). The transmission unit converts the variable length encoded data to a transport stream packet and transmits it to the external.

The decoding processing unit 205 performs a decoding process on the encoded image data from the encoding processing unit 203 and stores the partially-decoded image data thus obtained into the buffer memory 206.

The partially-decoded image data stored in the buffer memory 206 is inputted to the motion detection unit 207 in response to a read address signal d212 for the buffer memory which is outputted from the address controller 208.

In this instance, the image data d215 from the frame memory 202, the partially-decoded image data d213 from the buffer memory 208, and a motion compensation mode selection signal d211 from the outside are supplied to the motion detection unit 207.

The motion detection unit 207 first requests the address controller 208 to generate a read address for obtaining from the frame memory 202 and buffer memory 206, reference image data (image data d215) of the block selected for detection of the GMV as shown in the painted portions in FIG. 1 and the partially-decoded image data (partially-decoded image data d213) serving as a comparison target in the GMV detecting step. In response to this request, the address controller outputs the read address signals d214 and d212 corresponding to each data to the frame memory 202 and buffer memory 206, respectively. Thus, the image data d215 of the reference block selected for the GMV detection and read out in response to the read address signal d214 from the frame memory 202 and the partially-decoded data d213 read out from the buffer memory 206 in response to the read address signal d212 are inputted to the motion detection unit 207.

The motion detection unit 207 subsequently operates as described below. The operation will be explained with reference to FIG. 9.

The image data d215 (reference image data) from the frame memory 202 and the partially-decoded image data d213 (image data for comparison) from the buffer memory 206 are supplied to the subtractor 301. The subtractor 301 obtains a difference between the supplied data and outputs it.

The motion vector evaluation unit 302 evaluates (motion evaluation) a magnitude of the difference outputted from the subtractor 301. The blocks which are subjected to the motion evaluation are the blocks as shown by hatched portions in FIGS. 1 and 2. A motion search range for each block is arbitrarily set. Therefore, in the motion vector evaluation unit 302, the coordinates of the block at which the difference obtained by the subtractor 301 becomes the minimum for each of the target blocks to be subjected to the motion evaluation are determined as a motion vector of each target block.

The selector 303 selects either the method with the average value or the method with the weight cumulation as an evaluating method of the GMV d216 in response to the motion compensation mode selection signal (evaluation mode selection signal) d211 which is inputted from the external, and supplies the selection signal (including the motion vector obtained by the motion vector evaluation unit 302) according to the selected method to the average value calculation unit 304 or motion vector cumulating unit 305.

In response to the selection signal from the selector 303, the average value calculation unit 304 obtains an average value of the motion vectors obtained by the motion vector evaluation unit 302.

In response to the selection signal from the selector 303, the motion vector cumulating unit 305 also obtains a cumulative value obtained by adding weights to the motion vectors derived by the motion vector evaluation unit 302.

The GMV evaluation unit 306 determines a motion vector of the whole image (frame or field: "frame" here), namely, the GMV d216 from the average value of the motion vectors obtained by the average value calculation unit 304 or the cumulative value of the motion vectors obtained by the motion vector cumulating unit 305 and outputs it. The outputted GMV d216 is supplied to the encoding processing unit 203 (refer to FIG. 8).

Then, the encoding processing unit 203 performs a motion compensating process by setting the search range for the motion vector for motion compensation as a search range in which a point that is offset from the coordinate position of the search target block of the motion vector by a distance corresponding to the GMV d216 from the motion detection unit 207 as mentioned above is set to the motion vector search start point.

As mentioned above, in the encoding processing unit 203, since the searching time (substantial search range) of the motion vectors in the motion compensating process can be shortened by the GMV d216 from the motion detection unit 207, the whole processing time can be reduced.

The fourth embodiment of the invention is obtained by changing the internal construction of the encoding portion in FIG. 8.

Figure 10:
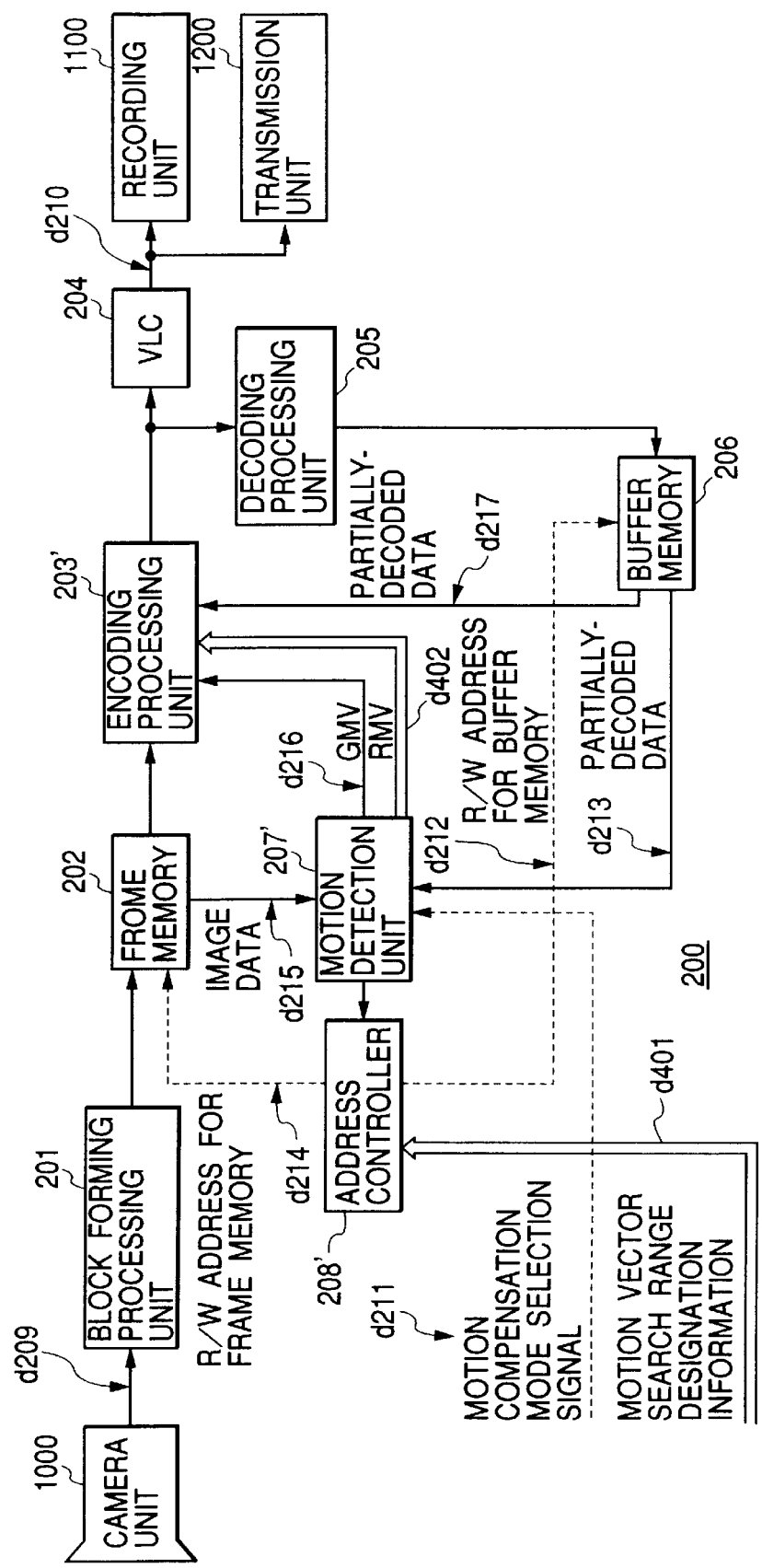
FIG. 10 is a block diagram showing a construction of a video camera to which the invention is applied in the fourth embodiment.

FIG. 10 is a block diagram showing a construction of a video camera in the fourth embodiment according to the invention.

A construction of the encoding portion in FIG. 10 also corresponds to an example of a hardware construction to realize the function of the encoding method of the second embodiment mentioned above. Only the construction different from that of the foregoing third embodiment will be specifically explained here.

As shown in FIG. 10, motion vector search range designation information d401 from the external is supplied to an address controller 208'. In addition to the foregoing GMV d216, an RMV (reference motion vector) d402 is also supplied to an encoding processing unit 203' from a motion detection unit 207'.

Figure 11:
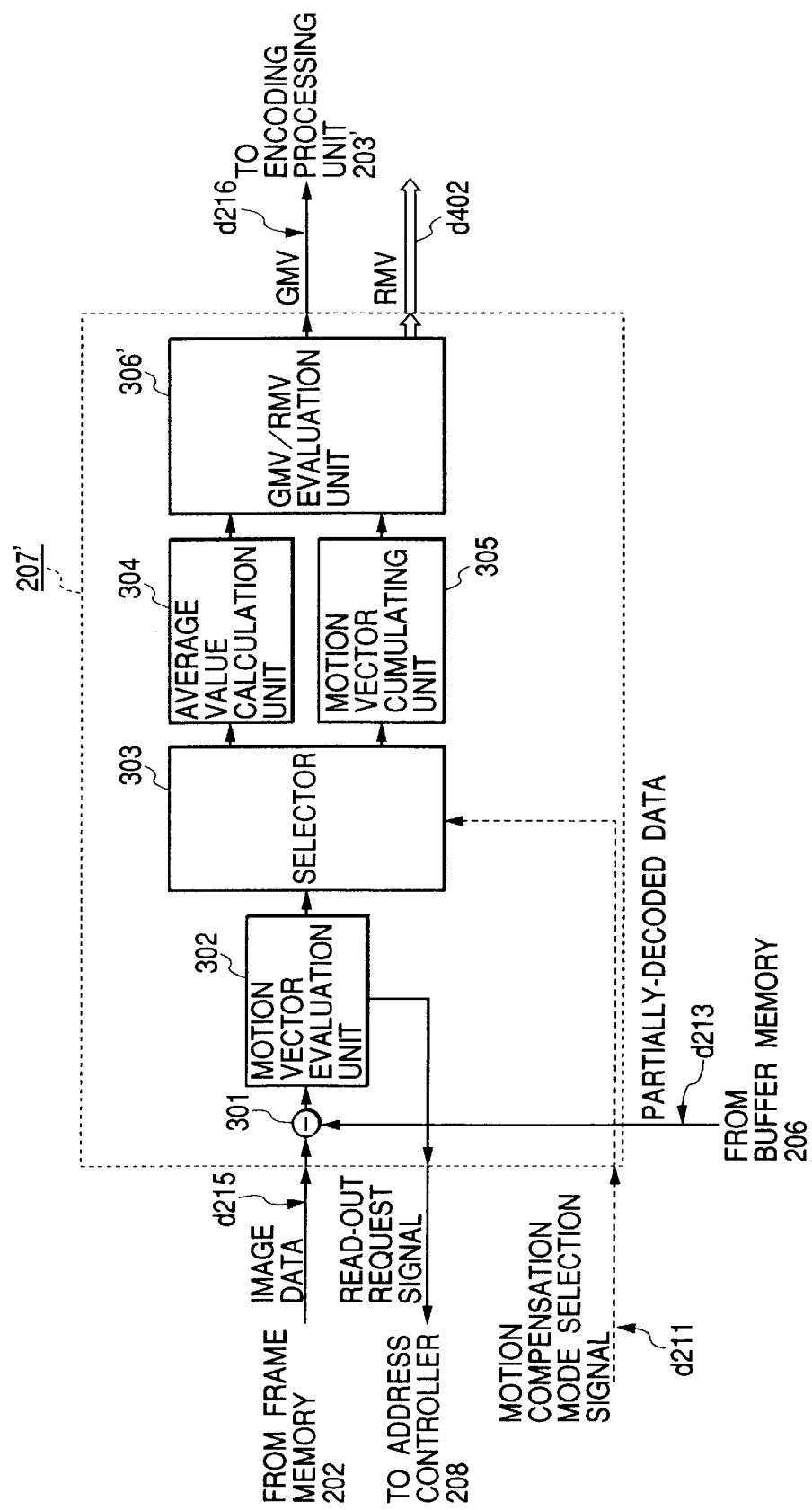
FIG. 11 is a block diagram showing a construction of a motion detection unit 207' in FIG. 10.

As shown in FIG. 11, in the motion detection unit 207', the GMV evaluation unit 306 determines and outputs the GMV d216 and decides and outputs the RMV d402.

First, the image data d209 from the camera unit 1000 is divided into blocks by the block forming processing unit 201 and once stored in the frame memory 202. The block forming image data stored in the frame memory 202 is sequentially read out and sent to the encoding processing unit 203' and subjected to the motion compensating process based on the GMV d216 from the motion detection unit 207' by the encoding processing unit 203'. After that, the predictive error signal thus obtained is subjected to a compressing process such as orthogonal transformation (DCT or the like), quantization, or the like. A variable length code is added to the resultant encoded image data by the variable length coding processing unit 204 and, after that, the resultant data is transmitted from the apparatus.

At the same time with it, the encoding image data obtained by the encoding processing unit 203' is subjected to a decoding process by the decoding processing unit 205 and the processed data is stored in the buffer memory 206.

The motion detection unit 207' (GMV/RMV detection block) requests the address controller 208' to generate read addresses of the reference blocks (blocks shown by the painted portions in FIGS. 1 and 2, the blocks shown by the hatch portions in FIGS. 3 and 7) of the input image data d209 selected to detect the GMV d216 or RMV d402 and the partially-decoded image data d213 serving as a comparison target in the detecting step of the GMV d216 or RMV d402. In response to this request, the address controller 208' generates the read address signals d214 and d212 to the frame memory 202 and buffer memory 206, respectively, thereby allowing the corresponding image data d215 and d213 to be inputted to the motion detection unit 207'.

In this instance, the read address signals d214 and d212 which are generated by the address controller 208' and inputted to the frame memory 202 and buffer memory 206 indicate the addresses of the blocks as search targets of the GMV d216 and RMV d402 which are designated by the motion vector search range designation information d401 from the external, respectively.

The foregoing addresses of the blocks are the addresses of the blocks as shown by the painted portions in FIGS. 1 and 2 with respect to the GMV d216 here and are the addresses of the blocks as shown by the hatched portions in FIGS. 3 and 7 with regard to the RMV d402.

After that, the motion detection unit 207' operates as will be explained below. This operation will be described with reference to FIG. 11.

First, a difference between the image data d215 (reference image data) from the frame memory 202 and the partially-decoded image data d213 (image data for comparison) from the buffer memory 206 is obtained by the subtractor 301. A magnitude of the difference is evaluated by the motion vector evaluation unit 302. The blocks which are subjected to the motion evaluation here are the blocks shown by the painted portions in FIGS. 1 and 2 with respect to the GMV d216 and the blocks shown by the hatched portions in FIGS. 3 and 7 with regard to the RMV d402. A motion search range for the GMV d216 and RMV d402 is arbitrarily set. The coordinates of the point in which the difference becomes the minimum for each target block of the motion evaluation are determined as a motion vector of the motion evaluation target block.

Subsequently, the evaluating method by the average value calculation unit 304 or motion vector cumulating unit 305 is selected by the selector 303 in response to the motion compensation mode selection signal d211 from the external.

By using the calculation result in the average value calculation unit 304 or motion vector cumulating unit 305, a GMV/RMV evaluation unit 306' determines the motion vector (GMV d216) of the whole image of the frame 101 or the RMV d402 indicative of the motion of the target portion (portion where a main pattern in the frame 101 exists, or the like) in the frame 101. The determined GMV d216 and RMV d402 are supplied to the encoding processing unit 203'.

Figure 12:
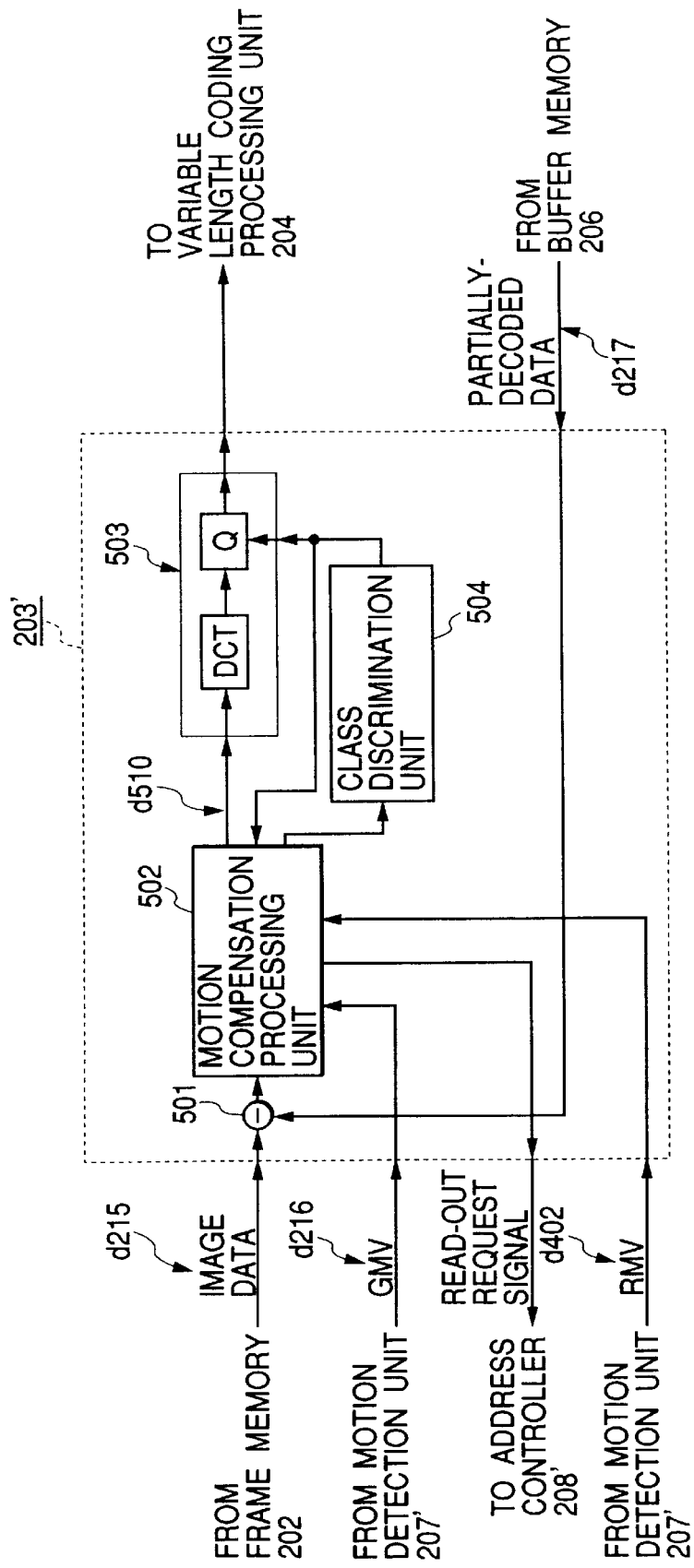
FIG. 12 is a block diagram showing a construction of an encoding processing unit 203' in FIG. 10.

As shown in FIG. 12, the encoding processing unit 203' comprises: a subtractor 501 for obtaining a difference between the image data (block forming image data) d215 from the frame memory 202 and partially-decoded image data d217 from the buffer memory 206; a motion compensation processing unit 502 for performing a motion compensating process by using the GMV d216 and RMV d402 from the motion detection unit 207'; an encoder 503 for performing a process such as orthogonal transformation, quantization, or the like to an output of the motion compensation processing unit 502; and a class discrimination unit 504 for classifying an output of the motion compensation processing unit 502 in order to applying a weight according to the motion of the image to a quantization coefficient in the encoder 503.

The input image data d215 from the frame memory 202 and the partially-decoded image data d217 from the buffer memory 206 are supplied to the subtractor 501 and a difference (predictive error signal) between them is obtained by the subtractor 501.

The motion compensation processing unit 502 performs a motion compensation to the predictive error signal obtained by the subtractor 501 and outputs the resultant signal. The motion vector in this instance is evaluated as follows.

That is, a difference between the GMV d216 and RMV d402 from the motion detection unit 207' is obtained and compared with a preset predetermined threshold value. When the difference is equal to or smaller than the threshold value as a result of the comparison, the motion vectors of all blocks in the frame are replaced with the RMV d402. When the difference exceeds the threshold value, the search for the motion vectors is made in a search range in which a point that is offset from the coordinate position of the motion vector search target block by a distance corresponding to the GMV d216 is set to a motion vector search start point (origin) as in an ordinary manner.

The encoder 503 executes an orthogonal transforming process ("DCT" here) on a predictive error signal d510 subjected to the motion compensation by the motion compensation processing unit 502 as mentioned above and quantizes (compresses) the thus obtained transformation coefficient by the quantization coefficient to which an arbitrary weight according to a frequency band has been applied. The obtained encoded image data is supplied to the variable length coding processing unit 204 and a variable length code is added to the image data here. After that, the resultant image data is recorded to an arbitrary media (hard disk, optical disk, memory card, magnetic tape, or the like) by the recording unit 1100, or the variable length encoded data is converted to a transport stream packet by the transmission unit 1200 and transmitted to the external.

The class discrimination unit 504 uses the size of motion vector of each block obtained by the motion compensation processing unit 502 as a parameter, divides the motion vector into a plurality of classes, and supplies the result of the classification to the encoder 503 and motion compensation processing unit 502, respectively.

Thus, when the motion vector is searched, if the size of motion vector is classified into the minimum class and is equal to or smaller than a predetermined threshold value, the motion compensation processing unit 502 replaces this size with zero with regard to the motion vectors of all blocks. In the other cases, the encoder 503 applies an arbitrary weight (a degree of weight is set to an arbitrary value) to the quantization coefficient every class and performs the foregoing quantization with the weighted quantization coefficient.

As mentioned above, by searching for the motion vectors by the motion compensation processing unit 502 and applying the weight to the quantization coefficient by the encoder 503 on the basis of the result of the classification by the class discrimination unit 504, the code amount and the picture quality are controlled.

The objects of the invention are also accomplished by a method whereby a memory medium in which program codes of software to realize the functions of the host computer and terminals in each embodiment mentioned above have been stored is supplied to a system or an apparatus and a computer (or a CPU or an MPU) of the system or apparatus reads out and executes the program codes stored in the memory medium.

In this case, the program codes themselves read out from the memory medium realize the functions of each embodiment and the memory medium in which the program codes have been stored constructs the invention.

As a memory medium to supply the program codes, it is possible to use an ROM, a floppy disk, a hard disk, an optical disk, a magnetooptic disk, a CD-ROM, a CD-R, a magnetic tape, a non-volatile memory card, or the like.

The invention incorporates not only a case where the functions of each embodiment are realized by executing the program codes read out by the computer but also a case where the OS or the like which operates on the computer executes a part or all of the actual processes on the basis of instructions of the program codes and the functions of each embodiment are realized by those processes.

Further, the invention also incorporates a case where the program codes read out from the memory medium are written into a memory equipped for a function expanding board inserted in a computer or a function expanding unit connected to the computer and, thereafter, a CPU or the like equipped for the function expanding board or function expanding unit performs a part or all of the actual processes on the basis of instructions of the program codes, and the functions of each embodiment are realized by those processes.

According to the embodiments as described above, in the input image of the frame or field to be subjected to the encoding, the motion vectors of the blocks existing at the first predetermined position (position at the outermost periphery or the like) among the blocks constructing the input image are searched and the average value of the motion vectors in each block thus obtained is calculated or the like, thereby obtaining the first motion vector (global motion vector: GMV) indicative of the motion of the whole frame or field. The motion vectors of the blocks existing at the second predetermined position (position near the center) are searched and the average value of the motion vectors in each block thus obtained is calculated or the like, thereby forming the second motion vector for reference (reference motion vector: RMV) for the first motion vector. On the basis of the first motion vector and second motion vector obtained as mentioned above, the encoding process (encoding mode) to be executed, the range for searching the motion vectors upon motion compensation, and the encoding parameters to execute the encoding process such as quantization coefficients or the like are determined.

Specifically speaking, for example, in the frame (or field) to be subjected to the encoding, the forward/backward motion vectors (GMV, RMV) are searched while limiting to a partial region in the frame (or field) or the partial macroblock, and whether the whole frame (or field) is moving or a part in the frame (or field) is moving is discriminated on the basis of the relation between the encoding target frame (or field) and the frame (or field) which is preceding or subsequent thereto with respect to time. On the basis of the result of this discrimination, it is discriminated whether the motion vector of the macroblock in which no motion vector is searched is searched or not, and the encoding mode of the encoding target frame (or field) or the encoding mode of the macroblock (or block) in the encoding target frame (or field) is decided.

By constructing as mentioned above, it is unnecessary to always search for the motion vectors with respect to the whole region in the encoding target frame (or field) and the time-dependent encoding efficiency can be improved. If the apparatus is constructed so as to change or correct the encoding mode or the quantization coefficient on a frame (or field) unit basis or a macroblock (or block) unit basis on the basis of the above discrimination result, the encoding according to the motion amount can be performed and the code amount can be properly distributed. Thus, the picture quality can be improved in case of the same code amount.

Therefore, according to the embodiments, since the whole motion vector for motion on a frame unit basis can be presumed prior to searching for the motion vector for the motion compensation, the motion vectors of all blocks in the frame can be defined without searching for the motion vectors in all blocks in the frame as for the image like a panchromatic image of the camera such that the whole frame linearly moves. Thus, the searching time for the motion vectors can be shortened, so that the processing time of the whole encoding process can be shortened.

The first motion vector (GMV) and the second motion vector (RMV) are compared with the predetermined threshold value or the like, and those motion vectors are evaluated, so that the encoding mode can be selected and the quantization coefficient can be adjusted on a frame unit basis or block unit basis. Therefore, with respect to the image in which the whole frame moves as mentioned above or the image having a nature of a high appearance frequency such that a part in the frame moves although the background is in a stationary state, the encoding process, quantization coefficient, and the like adapted to the nature of the image in the block can be selected and a control according to a design purpose such that importance is attached to the code amount, picture quality, or the like can be performed. Particularly, the encoding and quantization can be controlled by discriminating the motion image region and still image region.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An encoding apparatus for encoding input image data on a unit basis of a block of a predetermined size by using a motion compensation, comprising:

a) first detecting means for detecting motion vectors of the blocks of the input image data, located at a first predetermined area in a frame;

b) first forming means for forming a global motion vector representing a motion of the frame of the input image data from the motion vectors of the blocks detected by said first detecting means, said first forming means forming the global motion vector on the basis of the motion vectors detected from some of the blocks included in the frame by said first detecting means; and c) encoding means for performing a motion compensation on the input image data in accordance with the global motion vector formed by said first forming means to encode the image data.

2. An apparatus according to claim 1, wherein the blocks located at the first predetermined area are blocks located at an outer periphery among the blocks constituting the frame.

3. An apparatus according to claim 1, wherein said encoding means adaptively controls an encoding process in accordance with a result obtained by comparing the global motion vector with a predetermined threshold value.

4. An apparatus according to claim 1, wherein said encoding means has an interpicture encoding mode and an intrapicture encoding mode and selects either one of said encoding modes in accordance with the global motion vector.

5. An apparatus according to claim 1, wherein said encoding means determines a search range of motion vector in the motion compensation in accordance with the global motion vector.

6. An apparatus according to claim 1, further comprising:

second detecting means for detecting motion vectors of the blocks of the input image data, located at a second predetermined area in the frame, the second predetermined area being a partial area included within the frame; and second forming means for forming a reference motion vector from the motion vectors of the blocks detected by said second detecting means, wherein said encoding means executes the encoding using the motion compensation in accordance with the global motion vector and the reference motion vector.

7. An apparatus according to claim 6, wherein said encoding means executes the encoding using the motion compensation in accordance with a result obtained by comparing a difference between the global motion vector and the reference motion vector with a predetermined threshold value.

8. An apparatus according to claim 7, wherein when the difference is equal to or smaller than the predetermined threshold value, said encoding means replaces the motion vectors of all of the blocks constituting the image data as an encoding target to be searched for the motion compensation with the reference motion vector.

9. An apparatus according to claim 1, wherein said encoding means executes the encoding using the motion compensation in accordance with results obtained by comparing the motion vectors of all of the blocks constituting the image data as an encoding target searched for the motion compensation with the global motion vector on a block unit basis.

10. An apparatus according to claim 1, wherein said encoding means has quantizing means for quantizing the image data and controls a quantization coefficient of said quantizing means in accordance with sizes of the motion vectors of the blocks constructing the image data as an encoding target searched for said motion compensation.

11. An apparatus according to claim 10, wherein said encoding means classifies the motion vectors of the respective blocks into a plurality of groups in accordance with the sizes of the motion vectors and controls the quantization coefficient group by group.

12. An apparatus according to claim 1, further comprising image pickup means for picking up an object image and generating the input image data.

13. An apparatus according to claim 12, further comprising recording means for recording the image data encoded by said encoding means onto a recording medium.

14. An apparatus according to claim 12, further comprising transmitting means for transmitting the image data encoded by said encoding means to an external apparatus.

15. An encoding method of encoding input image data on a unit basis of a block of a predetermined size by using a motion compensation, comprising the steps of:

detecting motion vectors of the blocks of the input image data, located at a first predetermined area in a frame;

forming a global motion vector representing a motion of the frame of the input image data from the detected motion vectors of the blocks, wherein said forming step includes forming the global motion vector on the basis of the motion vectors detected from some of the blocks included in the frame in said detecting step; and performing a motion compensation to the input image data in accordance with the formed global motion vector to encode the image data.

16. A computer-readable memory medium in which a program for realizing an encoding processing method according to claim 15 has been stored.

* * * * *

UNITED STATES PATENT AND TRADEMARK OFFICE
CERTIFICATE OF CORRECTION

PATENT NO. : 6,778,605 B1  
APPLICATION NO. : 09/526183  
DATED : August 17, 2004  
INVENTOR(S) : Akiyoshi Hamanaka et al.

Page 1 of 1

It is certified that error appears in the above-identified patent and that said Letters Patent is hereby corrected as shown below:

COLUMN 3

Line 9, "locating" should read --located--;  
       Line 11, "dose" should read --does--;  
       Line 14, "locating" should read --located--;  
       Line 17, "locating" should read --located--;  
       Line 43, "locating" should read --located--;  
       Line 54, "locating" should read --located--; and  
       Line 63, "locating" should read --located--.

COLUMN 5

Line 11, "locating" should read --located--; and  
       Line 29, "locating" should read --located--.

COLUMN 9

Line 59, "applying" should read --apply--.

COLUMN 11

Line 1, "magnetooptic" should read --magneto-optical--.

COLUMN 12

Line 27, "every" should read --any--.

Signed and Sealed this

Twenty-fourth Day of July, 2007

JON W. DUDAS  
*Director of the United States Patent and Trademark Office*